(12) United States Patent
Tanaka

(10) Patent No.: US 9,181,492 B2
(45) Date of Patent: Nov. 10, 2015

(54) METHOD FOR PRODUCING HYDROCARBON OIL, FISCHER-TROPSCH SYNTHESIS REACTION DEVICE, AND HYDROCARBON OIL PRODUCTION SYSTEM

(71) Applicants: JAPAN OIL, GAS AND METALS NATIONAL CORPORATION, Tokyo (JP); INPEX CORPORATION, Tokyo (JP); JX NIPPON OIL & ENERGY CORPORATION, Tokyo (JP); JAPAN PETROLEUM EXPLORATION CO., LTD., Tokyo (JP); COSMO OIL CO., LTD., Tokyo (JP); NIPPON STEEL & SUMIKIN ENGINEERING CO., LTD., Tokyo (JP)

(72) Inventor: Yuichi Tanaka, Tokyo (JP)

(73) Assignees: JAPAN OIL, GAS AND METALS NATIONAL CORPORATION, Tokyo (JP); INPEX CORPORATION, Tokyo (JP); JX NIPPON OIL & ENERGY CORPORATION, Tokyo (JP); JAPAN PETROLEUM EXPLORATION CO., LTD., Tokyo (JP); COSMO OIL CO., LTD., Tokyo (JP); NIPPON STEEL & SUMIKIN ENGINEERING CO., LTD., Tokyo (JP)

(*) Notice: Subject to any disclaimer, the term of this patent is extended or adjusted under 35 U.S.C. 154(b) by 0 days.

(21) Appl. No.: 14/628,777

(22) Filed: Feb. 23, 2015

(65) Prior Publication Data

US 2015/0166900 A1 Jun. 18, 2015

Related U.S. Application Data

(62) Division of application No. 14/008,033, filed as application No. PCT/JP2012/057771 on Mar. 26, 2012, now Pat. No. 8,993,642.

(30) Foreign Application Priority Data

Mar. 31, 2011 (JP) ................................. 2011-080611

(51) Int. Cl.
*B01J 8/18* (2006.01)
*C10G 2/00* (2006.01)
(Continued)

(52) U.S. Cl.
CPC ................. *C10G 2/34* (2013.01); *B01D 37/048* (2013.01); *B01D 43/00* (2013.01); *B01J 8/1809* (2013.01);
(Continued)

(58) Field of Classification Search
CPC .. C10G 2/342; C10G 2300/4006; C10G 3/60; B01D 37/048; B01D 43/00; B01J 8/006; B01J 2219/0083
USPC ........................................................ 422/140
See application file for complete search history.

(56) References Cited

U.S. PATENT DOCUMENTS 6,069,179 A 5/2000 Rytter et al.
(Continued)

FOREIGN PATENT DOCUMENTS

| CN | 1325443 | 7/2007 |
|---|---|---|
| JP | 2000-516139 | 12/2000 |

(Continued)

OTHER PUBLICATIONS

Translation of the International Preliminary Report on Patentability for International Application No. PCT/JP2012/057771, mailed on Oct. 17, 2013.
(Continued)

*Primary Examiner* — Jafar Parsa
(74) *Attorney, Agent, or Firm* — Greenblum & Bernstein, P.L.C.

(57) ABSTRACT

The present invention provides a process for producing a hydrocarbon oil by performing a Fischer-Tropsch synthesis reaction using a reactor for a Fischer-Tropsch synthesis including a reaction apparatus having a slurry containing catalyst particles and a gaseous phase located above the slurry to obtain a hydrocarbon oil, wherein the Fischer-Tropsch reaction is performed while controlling a temperature of the slurry so that a difference $T_2-T_1$ between the average temperature $T_1$ of the slurry and a temperature $T_2$ at the liquid level of the slurry in contact with the gaseous phase is 5 to 30° C.

3 Claims, 2 Drawing Sheets

(51) Int. Cl.
*C10G 3/00* (2006.01)
*B01D 37/04* (2006.01)
*B01D 43/00* (2006.01)
*B01J 8/22* (2006.01)
*B01J 8/00* (2006.01)

(52) U.S. Cl.
CPC . *B01J 8/22* (2013.01); *C10G 2/342* (2013.01); *C10G 3/60* (2013.01); *B01J 8/006* (2013.01); *B01J 2208/00017* (2013.01); *B01J 2219/00083* (2013.01); *C10G 2300/4006* (2013.01)

(56) References Cited

U.S. PATENT DOCUMENTS

| | | |
|---|---|---|
| 6,322,755 B1 | 11/2001 | Hoek et al. |
| 6,822,007 B2 | 11/2004 | Ketley et al. |
| 2002/0035163 A1 | 3/2002 | Vogel et al. |
| 2003/0018089 A1 | 1/2003 | Schweitzer et al. |
| 2004/0044090 A1 | 3/2004 | Font Freide et al. |
| 2004/0127585 A1 | 7/2004 | Raje |
| 2004/0132839 A1 | 7/2004 | Ketley et al. |
| 2007/0014703 A1 | 1/2007 | Schweitzer et al. |
| 2010/0216896 A1 | 8/2010 | Wang et al. |
| 2010/0247392 A1 | 9/2010 | Onishi et al. |
| 2011/0028574 A1 | 2/2011 | Woo et al. |
| 2012/0178831 A1 | 7/2012 | Tasaka |
| 2014/0088204 A1 | 3/2014 | Tanaka |

FOREIGN PATENT DOCUMENTS

| | | |
|---|---|---|
| JP | 2004-323626 | 11/2004 |
| JP | 2011-63700 | 3/2011 |
| WO | 02/096840 | 12/2002 |
| WO | 2009/041604 | 4/2009 |
| WO | 2011/034036 | 3/2011 |

OTHER PUBLICATIONS

International Search Report for International Application No. PCT/JP2012/057771, mailed on May 1, 2012.
Office Action for Chinese Patent Application No. 201280017091.9 which is dated Aug. 11, 2014.
Extended European Search Report for EP Patent Application No. 12764601.6-1352, which was mailed Nov. 5, 2014.
Japanese Office Action for Application No. JP 2011-080611, issued on Jun. 2, 2015.

METHOD FOR PRODUCING HYDROCARBON OIL, FISCHER-TROPSCH SYNTHESIS REACTION DEVICE, AND HYDROCARBON OIL PRODUCTION SYSTEM

This application is a Divisional of U.S. application Ser. No. 14/008,033, which is the National Stage of International Application No. PCT/JP2012/057771, filed on Mar. 26, 2012, which claims priority to Japanese Application No. 2011-080611, filed Mar. 31, 2011. The disclosures of each of U.S. patent application Ser. No. 14/008,033 and PCT/JP2012/057771 are expressly incorporated by reference herein in their entireties.

TECHNICAL FIELD

The present invention relates to a reactor for a Fischer-Tropsch synthesis, a system for producing a hydrocarbon oil, and a process for producing a hydrocarbon oil.

BACKGROUND ART

Recently, from the viewpoint of reduction in environmental load, eco-friendly and clean liquid fuels in which the contents of sulfur and aromatic hydrocarbons are small have been demanded. From such a viewpoint, as a technique for producing raw material hydrocarbons in order to produce a base stock for fuel oil that contains no sulfur or aromatic hydrocarbons and is rich in aliphatic hydrocarbons, particularly, a base stock for kerosene and gas oil, a method using a Fischer-Tropsch synthesis reaction (hereinafter, referred to as the "FT synthesis reaction" in some cases) in which carbon monoxide gas and hydrogen gas are used as raw materials has been examined.

Moreover, a technique in which synthesis gas mainly containing carbon monoxide gas and hydrogen gas is produced by reforming of a gaseous hydrocarbon raw material such as natural gas, a hydrocarbon oil (hereinafter, referred to as the "FT synthetic oil" in some cases) is synthesized from the synthesis gas by the FT synthesis reaction, and further, through an upgrading section that is a section of hydrotreating the FT synthetic oil to produce a variety of base stocks for liquid fuel oil, a base stock for kerosene and gas oil and naphtha or a wax and the like are produced is known as a GTL (Gas To Liquids) process (see Patent Literature 1 described below, for example.).

As a synthesis reaction system that synthesizes a hydrocarbon oil by the FT synthesis reaction, for example, a slurry bubble column FT synthesis reaction system that blows synthesis gas into a slurry, in which solid catalyst (hereinafter, referred to as the "FT synthesis catalyst" in some cases) particles having activity to the FT synthesis reaction are suspended in a hydrocarbon oil, to perform the FT synthesis reaction is disclosed (see Patent Literature 2 described below, for example.).

CITATION LIST

Patent Literature

[Patent Literature 1] Japanese Patent Application Laid-Open Publication No. 2004-323626
[Patent Literature 2] U.S. Patent Application Laid-Open Publication No. 2007/0014703

SUMMARY OF INVENTION

Technical Problem

Examples of the slurry bubble column FT synthesis reaction system include an external circulating system including a reaction apparatus that accommodates a slurry to perform the FT synthesis reaction, a gas feeder that blows synthesis gas into the bottom of the reaction apparatus, an effluent pipe that discharges from the reaction apparatus a slurry containing a hydrocarbon oil which is liquid under a condition in the reaction apparatus (hereinafter, referred to as the "heavy hydrocarbon oil") of the hydrocarbon oil obtained by the FT synthesis reaction in the reaction apparatus, a discharge line that discharges from a gaseous phase in the upper portion of the reaction apparatus a gas fraction containing hydrocarbons which are gaseous under the condition in the reaction apparatus (hereinafter, referred to as the "light hydrocarbons") of the hydrocarbon oil obtained by the FT synthesis reaction in the reaction apparatus, a catalyst separator that separates the slurry discharged via the effluent pipe into the hydrocarbon oil and the FT synthesis catalyst particles, and a send back pipe that sends back the FT synthesis catalyst particles and a part of the hydrocarbon oil separated by the catalyst separator into the reaction apparatus.

The catalyst separator in the slurry bubble column FT synthesis reaction system includes a filter having openings of approximately 10 μm, for example. The FT synthesis catalyst particles in the slurry are captured by the filter to be separated from the hydrocarbon oil. Then, the FT synthesis catalyst particles captured by the filter are returned to the reaction apparatus by appropriately flowing liquid hydrocarbons in a direction opposite to the normal flowing direction (backwashing), and reused.

However, there is a problem that the repetition of capturing the FT synthesis catalyst particles by the filter and backwashing the filter causes clogging in the filter which cannot be fully removed by the backwashing, thereby leading to increase in pressure loss in the filter. If the pressure loss in the filter is increased to a predetermined value or more, the FT synthesis reaction system itself must be stopped.

As a method for reducing a load of the filter, it is considered to reduce an amount of the slurry to be fed to the filter, namely, to increase an amount of hydrocarbons that do not pass through the filter and are discharged as gas from the gaseous phase of the upper portion of the reaction apparatus (amount of hydrocarbons to be discharged as light hydrocarbons), to reduce an amount of hydrocarbons to be discharged as a heavy hydrocarbon oil passing through the filter. However, in order to realize this, if a temperature of the slurry is raised to increase the amount of hydrocarbons to be discharged as light hydrocarbons, there is a problem that a reaction temperature of the FT synthesis reaction is changed to thereby change the composition of a hydrocarbon oil to be obtained.

Therefore, an object of the present invention is to provide a process for producing a hydrocarbon oil that can reduce a load of a filter for capturing a FT synthesis catalyst while maintaining a composition of a hydrocarbon oil to be obtained, as well as a reactor for a Fischer-Tropsch synthesis and a system for producing a hydrocarbon oil that can realize this.

Solution to Problem

In order to solve the problems above, the present inventors have studied intensively, and as a result, have found that, although conventionally the temperature of the slurry (namely, the reaction temperature of the FT synthesis reaction) has been generally uniform as much as possible over the entire area of the slurry, a composition of a hydrocarbon oil to be produced is kept constantly as long as the average temperature of the slurry is constant even though a temperature of a liquid level of the slung is raised, and have found that the higher temperature at the liquid level of the slurry than the average temperature of the slurry increases the amount of hydrocarbons to be discharged as light hydrocarbons, and have led to complete the present invention.

Namely, the present invention provides a process for producing a hydrocarbon oil by performing a Fischer-Tropsch synthesis reaction using a reactor for a Fischer-Tropsch synthesis comprising a reaction apparatus having a slurry containing catalyst particles and a gaseous phase located above the slurry to obtain a hydrocarbon oil, wherein the Fischer-Tropsch reaction is performed while controlling a temperature of the slurry so that a difference $T_2-T_1$ between an average temperature $T_1$ of the slurry and a temperature $T_2$ of a liquid level of the slurry in contact with the gaseous phase is 5 to 30° C.

According to the process for producing a hydrocarbon oil of the present invention, the substantially same composition of a hydrocarbon oil as the case where the temperature of the entire area of the slurry is $T_1$ can be obtained, and the amount of hydrocarbons to be fed to the following stage without passing through a filter for capturing the FT synthesis catalyst as light hydrocarbons can be increased. Namely, according to the process for producing a hydrocarbon oil of the present invention, a load of a filter for capturing the FT synthesis catalyst is reduced while maintaining a composition of a hydrocarbon oil to be obtained.

The present invention also provides a reactor for a Fischer-Tropsch synthesis for obtaining a hydrocarbon oil by contacting raw gas containing carbon monoxide and hydrogen with a slurry containing catalyst particles, the reactor comprising: a reaction apparatus having the slurry and a gaseous phase located above the slurry; a raw gas feeder for feeding the raw gas to the slurry; and temperature control means for controlling a temperature of the slurry so that a difference $T_2-T_1$ between an average temperature $T_1$ of the slurry and a temperature $T_2$ at the liquid level of the slurry in contact with the gaseous phase is 5 to 30° C.

The present invention also provides a system for producing a hydrocarbon oil comprising the reactor for a Fischer-Tropsch synthesis.

According to the reactor for a Fischer-Tropsch synthesis and the system for producing a hydrocarbon oil of the present invention, the process for producing a hydrocarbon oil of the present invention can be easily carried out. Therefore, the reactor for a Fischer-Tropsch synthesis and the system for producing a hydrocarbon oil of the present invention can appropriately carry out the process for producing a hydrocarbon oil of the present invention to reduce a load of a filter when the load of a filter needs to be reduced.

Advantageous Effects of Invention

According to the present invention, the process for producing a hydrocarbon oil that can reduce a load of a filter for capturing a FT synthesis catalyst while maintaining a composition of a hydrocarbon oil to be obtained, as well as the reactor for a Fischer-Tropsch synthesis and the system for producing a hydrocarbon oil that can realize this are provided.

DESCRIPTION OF EMBODIMENTS

Figure 1:
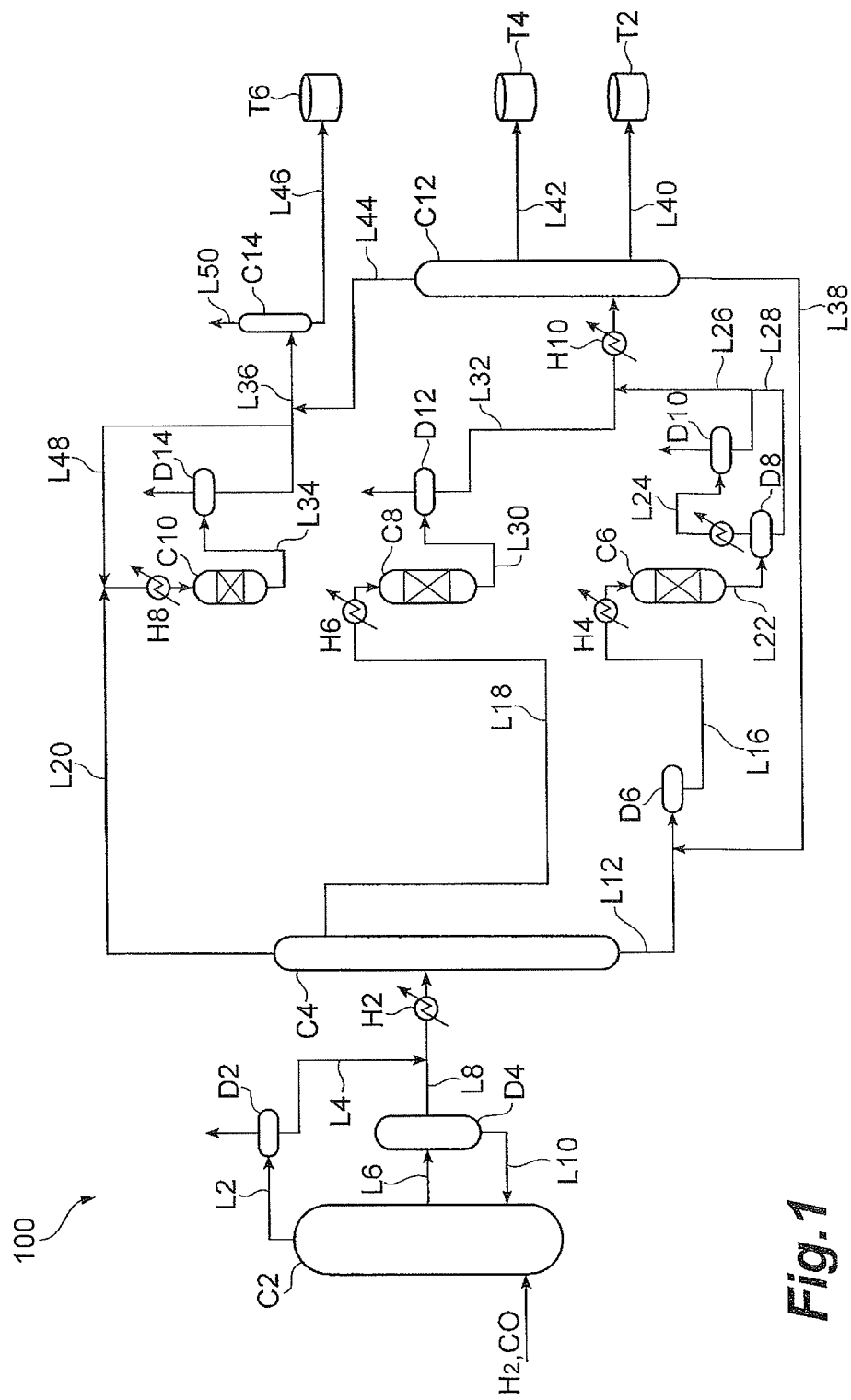
FIG. 1 is a schematic view of a system for producing a hydrocarbon oil according to one embodiment of the present invention.

Hereinafter, with reference to the drawings, a system for producing a hydrocarbon oil according to one embodiment of the present invention and a process for producing a hydrocarbon oil using the production system will be described in detail. Here, same reference numerals will be given to same or identical components.

(Summary of System for Producing Hydrocarbon Oil)

A system for producing a hydrocarbon oil 100 to be used in the present embodiment is a plant facility for carrying out a GTL process that converts a hydrocarbon raw material such as natural gas to a base stock for liquid fuel (hydrocarbon oil) such as gas oil, kerosene, and naphtha. The system for producing a hydrocarbon oil of the present embodiment 100 mainly includes a reformer (not shown), a slurry bubble column reactor C2, a first fractionator C4, a hydrocracking apparatus C6, a middle distillate hydrotreating apparatus C8, a naphtha fraction hydrotreating apparatus C10 and a second fractionator C12.

Figure 2:
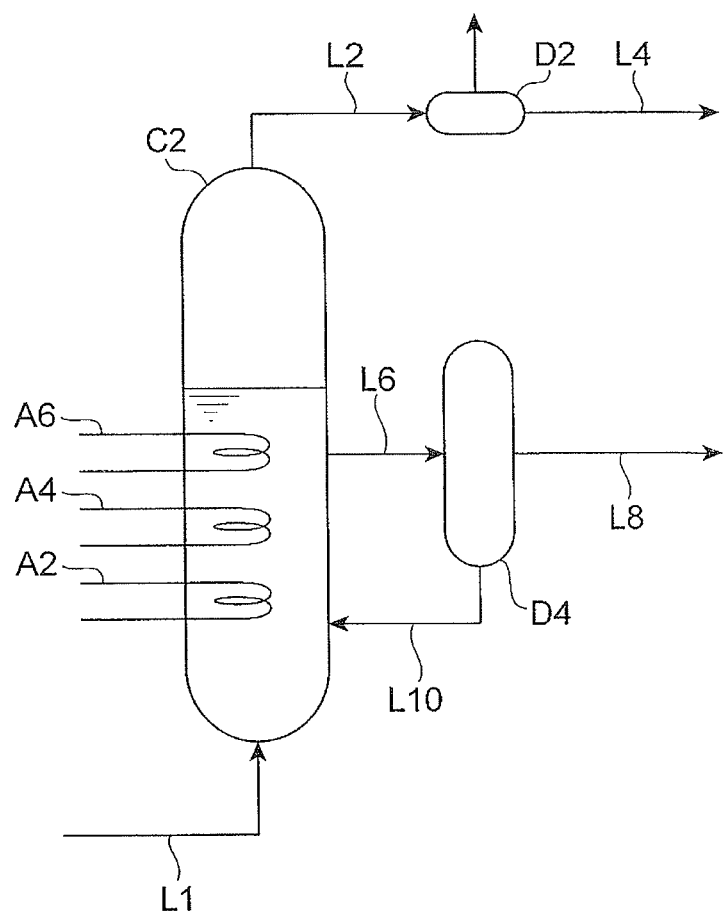
FIG. 2 is a schematic view of a reactor for a Fischer-Tropsch synthesis according to one embodiment of the present invention.

As shown in FIG. 1 and FIG. 2, a slurry bubble column FT reaction system including the slurry bubble column reactor C2 includes, for example, the slurry bubble column reactor C2 that accommodates a slurry containing the FT synthesis catalyst, a gas feeder L1 that blows synthesis gas to the bottom of the reaction apparatus, a line L2 that discharges gaseous hydrocarbons and unreacted synthesis gas obtained from the FT synthesis reaction from the top of the slurry bubble column reactor C2, a gas liquid separator D2 that cools the gaseous hydrocarbons and the unreacted synthesis gas discharged from the line L2, and separates a light hydrocarbon oil and a gas fraction into gas and liquid, an effluent pipe L6 that discharges a slurry containing a hydrocarbon oil from the reaction apparatus, a catalyst separator D4 that separates the slurry discharged via the effluent pipe L6 into a hydrocarbon oil and FT synthesis catalyst particles, a send back pipe L10 that sends back the FT synthesis catalyst particles and a part of the hydrocarbon oil separated from the catalyst separator D4 to the reactor C2, and temperature control means for controlling a temperature of the slurry containing the FT synthesis catalyst. Here, the "line" means a pipe for transferring a fluid.

In the present embodiment, the temperature control means for controlling the temperature of the slurry is provided with heat-transfer pipes A2, A4 and A6 into which cooling water is flowed, sequentially from the bottom of the slurry bubble column reactor C2 to the vicinity of a liquid level of the slurry. The heat-transfer pipe A2, A6 and A4 are provided so as to control a temperature of the lower portion of the slurry including the bottom of the slurry bubble column reactor C2, so as to control a temperature of the upper portion of the slurry including the liquid level of the slurry, and so as to control a temperature of the middle of the slurry between them, respectively, and the temperatures to be controlled by the heat-transfer pipe A2, A4 and A6 are appropriately controlled, thereby making it possible to control the average temperature $T_1$ of the slurry and a temperature $T_2$ at the liquid level of the slurry.

It is to be noted that the temperature control means in the present invention is not limited thereto, and may be means which can control the temperature of the slurry so that a difference $T_2-T_1$ between the average temperature $T_1$ of the slurry and the temperature $T_2$ at the liquid level of the slurry is 5 to 30° C. For example, a cooling oil may be flowed into the heat-transfer pipes A2, A4 and A6 in place of cooling water. Moreover, reaction gas, unreacted gas, and a produced oil of the FT synthesis reaction may also be cycled to control the temperature.

Moreover, in the process for producing a hydrocarbon oil of the present invention, means for controlling the temperature of the slurry is not limited to the above-described temperature control means. For example, the temperature of the slurry can also be controlled by controlling the temperature of synthesis gas to be blown to the bottom of the slurry bubble column reactor C2.

Moreover, the slurry bubble column reactor C2 may include temperature measurement means that measures the average temperature $T_1$ of the slurry and the temperature $T_2$ at the liquid level of the slurry.

Here, the average temperature $T_1$ of the slurry is a value determined by an arithmetic average of temperatures measured by the temperature measurement means over the entire area. Moreover, the temperature $T_2$ at the liquid level of the slurry is a value determined by the closest temperature measurement means to the liquid level among the temperature measurement means over the entire area, namely, the temperature measurement means located between the liquid level of the slurry and a position to the length of one fifth of the vertical direction height of the slurry downward the vertical direction from the liquid level of the slurry in the slurry bubble column reactor C2.

(Summery of Process for Producing Hydrocarbon Oil

The process for producing a hydrocarbon oil using the production system 100 includes the following Step S1 to S8.

In Step S1, natural gas as a hydrocarbon raw material is reformed in the reformer (not shown) to produce synthesis gas containing carbon monoxide gas and hydrogen gas.

In Step S2, a hydrocarbon oil (FT synthetic oil) is synthesized from the synthesis gas obtained in Step S1 by the FT synthesis reaction using the FT synthesis catalyst in the slurry bubble column reactor C2. In Step S2, the temperature of the slurry is appropriately controlled in order to reduce a load of a filter.

In Step S3, the FT synthetic oil obtained in Step S2 is fractionated into at least one distilled oil and a bottom oil in the first fractionator C4. In the present embodiment, by this fractionating, the FT synthetic oil is separated into a raw naphtha fraction, a raw middle distillate, and a raw wax fraction. Here, the raw naphtha fraction and the raw middle distillate are distilled oils discharged from the top and the middle of the first fractionator C4, respectively, and the raw wax fraction is a bottom oil discharged from the bottom thereof. Here, the raw naphtha fraction, the raw middle distillate, and the raw wax fraction each refer to a fraction obtained by fractionating from the FT synthetic oil and not subjected to a hydrotreating or hydrocracking treatment.

The steps subsequent to Step S4 to be described below constitute the upgrading step of the FT synthetic oil. In Step S4, the raw wax fraction that is the bottom oil of the first fractionator C4, separated in Step S3, is transferred from the first fractionator C4 to the hydrocracking apparatus C6. The raw wax fraction is transferred through first transfer lines L12 and L16 that connect the bottom of the first fractionator C4 to the hydrocracking apparatus C6.

In Step S5, the raw wax fraction separated in Step S3 and transferred in Step S4 is hydrocracked in the hydrocracking apparatus C6.

In Step S6, the raw middle distillate is hydrotreated in the middle distillate hydrotreating apparatus C8.

In Step S7, the raw naphtha fraction is hydrotreated in the naphtha fraction hydrotreating apparatus C10. In addition, the hydrotreated naphtha fraction is fractionated in a naphtha stabilizer C14 to recover naphtha (GTL-naphtha) that is a product of the GTL process.

In Step S8, a mixture of a hydrocracking product of the raw wax fraction and a hydrotreating product of the raw middle distillate is fractionated in the second fractionator C12. By this fractionating, a base stock for gas oil (GTL-gas oil) and a base stock for kerosene (GTL-kerosene) that are products of the GTL process are recovered.

Hereinafter, each of Steps S1 to S8 will be described in more detail.

(Step S1)

In Step S1, a sulfur compound contained in natural gas is removed by a desulfurization apparatus (not shown). Usually, this desulfurization apparatus is configured by a hydro-desulfurization reaction apparatus packed with a known hydro-desulfurization catalyst and an adsorptive desulfurization apparatus provided at the following stage and packed with an adsorptive material for hydrogen sulfide, such as zinc oxide. The natural gas is fed to the hydro-desulfurization reaction apparatus with hydrogen, and the sulfur compound in the natural gas is converted into hydrogen sulfide. Subsequently, the hydrogen sulfide is removed by adsorption and the natural gas is desulfurized in the adsorptive desulfurization apparatus. This desulfurization of the natural gas prevents a reforming catalyst packed in the reformer and the FT synthesis catalyst to be used in Step S2 and the like from being poisoned by the sulfur compound.

The desulfurized natural gas is fed to reforming using carbon dioxide and steam in the reformer to produce synthesis gas at a high temperature containing carbon monoxide gas and hydrogen gas as main components. The reforming reaction of the natural gas in Step S1 is represented by the following reaction formulae (1) and (2). It is to be noted that the reforming method is not limited to a steam/carbon dioxide gas reforming method using carbon dioxide and steam; for example, a steam reforming method, a partial oxidation reforming method (POX) using oxygen, an autothermal reforming method (ATR) that is a combination of the partial oxidation reforming method and the steam reforming method, a carbon dioxide gas reforming method, or the like can also be used.

$$CH_4 + H_2O \rightarrow CO + 3H_2 \qquad (1)$$

$$CH_4 + CO_2 \rightarrow 2CO + 2H_2 \qquad (2)$$

(Step S2)

In Step S2, the synthesis gas produced in Step S1 is fed to the slurry bubble column reactor C2, and hydrocarbons are synthesized from hydrogen gas and carbon monoxide gas in the synthesis gas.

As shown in FIG. 2, the slurry bubble column FT reaction system including the slurry bubble column reactor C2 mainly includes the slurry bubble column reactor C2 that accommodates a slurry containing the FT synthesis catalyst, the gas feeder L1 that blows the synthesis gas into the bottom of the reaction apparatus, the line L2 that discharges light hydrocarbons which are obtained by the FT synthesis reaction and which are gaseous under the condition in the reaction apparatus and unreacted synthesis gas from the top of the slurry bubble column reactor C2, the gas liquid separator D2 that cools the gaseous hydrocarbons and the unreacted synthesis gas discharged from the line L2, and separates a condensed light hydrocarbon oil and a gas fraction into gas and liquid, the effluent pipe L6 that discharges a slurry containing a hydrocarbon oil from the reaction apparatus, the catalyst separator D4 that separates the slurry discharged through the effluent pipe L6 into a hydrocarbon oil and FT synthesis catalyst particles, and the send back pipe L10 that sends back the FT synthesis catalyst particles and a part of the hydrocarbon oil separated by the catalyst separator D4 into the reactor C2, and the temperature control means that controls a temperature of the slurry containing the FT synthesis catalyst, for example.

In the present embodiment, the temperature control means that controls the temperature of the slurry is provided with heat-transfer pipes A2, A4 and A6 into which cooling water is flowed, from the bottom of the shiny bubble column reactor C2 to the vicinity of a liquid level of the slurry.

The temperature control means can control the temperature of the slurry so that the difference $T_2-T_1$ between the average temperature $T_1$ of the slurry and the temperature $T_2$ at the liquid level of the slurry is 5 to 30° C., and controls the temperature of the slurry if necessary (for example, under a circumstance where a load of a filter is needed to be reduced) as described above.

As the FT synthesis catalyst to be used in the slurry bubble column reactor C2, a known carrier type FT synthesis catalyst in which an active metal is supported by an inorganic catalyst support. As the inorganic catalyst support, porous oxides such as silica, alumina, titania, magnesia, and zirconia are used, silica or alumina is preferable, and silica is more preferable. Examples of the active metal include cobalt, ruthenium, iron, and nickel, cobalt and/or ruthenium is preferable, and cobalt is more preferable. The amount of the active metal to be supported is preferably 3 to 50% by mass, and more preferably 10 to 40% by mass based on the mass of the catalyst support. In the case where the amount of the active metal to be supported is less than 3% by mass, the activity tends to be insufficient, and in the case where the amount is more than 50% by mass, the activity tends to be deteriorated by aggregation of the active metal. Moreover, other component than the active metal may be supported in the FT synthesis catalyst for the purpose of improving the activity and controlling a number of carbon atoms of hydrocarbons to be produced and a distribution thereof. Examples of the other component include a compound containing the active metal element such as zirconium, titanium, hafnium, sodium, lithium, and magnesium. The average particle size of the FT synthesis catalyst particles is preferably 40 to 150 μm so that the catalyst particles easily flow in the slurry bubble column reactor C2 as the slurry suspended in the liquid hydrocarbons. Moreover, the shape of the FT synthesis catalyst particles is preferably spherical also from the viewpoint of the fluidity as the slurry.

The active metal is supported by a catalyst support by a known method. Examples of the compound containing the active metal element to be used for supporting can include salts of mineral acid of an active metal, such as nitric acid salts, hydrochloric acid salts, and sulfuric acid salts; salts of organic acid such as formic acid, acetic acid, and propionic acid; and complex compounds such as acetylacetonate complexes. The supporting method is not particularly limited, but an impregnation method represented by an Incipient Wetness method using a solution of a compound containing an active metal element is preferably used. The catalyst support by which the compound containing an active metal element is supported is dried by a known method, and more preferably calcined under an air atmosphere by a known method. The calcining temperature is not particularly limited, but it is generally about 300 to 600° C. The compound containing an active metal element on the catalyst support is converted into a metal oxide by calcining.

In order that the FT synthesis catalyst may exert a high activity to the FT synthesis reaction, it is necessary that the active metal atom be converted into a metal by a reduction treatment of the catalyst in which the active metal atom is oxidized. This reduction treatment is usually performed by bringing the catalyst into contact with reducing gas under heating. Examples of the reducing gas include hydrogen gas, gases containing hydrogen gas such as a mixed gas of hydrogen gas and an inert gas such as nitrogen gas, and carbon monoxide gas; preferable is hydrogen containing gas, and more preferable is hydrogen gas. The temperature in the reduction treatment is not particularly limited, but it is preferable that it be generally 200 to 550° C. In the case where the reduction temperature is lower than 200° C., the active metal atom tends not to be sufficiently reduced and not to sufficiently exert the catalyst activity; and in the case where the temperature is higher than 550° C., the catalyst activity tends to be deteriorated due to aggregation of the active metal or the like. The pressure in the reduction treatment is not particularly limited, but it is preferable that it be generally 0.1 to 10 MPa. In the case where the pressure is lower than 0.1 MPa, the active metal atom tends not to be sufficiently reduced and not to sufficiently exert the catalyst activity; and in the case where the pressure is higher than 10 MPa, facility cost tends to be increased for a need to increase pressure resistance of the apparatus. The time of the reduction treatment is not particularly limited, but it is preferable that it be generally 0.5 to 50 hours. In the case where the reduction time is less than 0.5 hours, the active metal atom tends not to be sufficiently reduced and not to sufficiently exert the catalyst activity; and in the case where the reduction time is more than 50 hours, the catalyst activity tends to be deteriorated due to aggregation of the active metal or the like, and the efficiency tends to be reduced. The facility in which the reduction treatment is performed is not particularly limited, but the reduction treatment may be performed in the absence of liquid hydrocarbons in the reaction apparatus to perform the FT synthesis reaction, for example. The reduction treatment may also be performed in a facility connected to the reaction apparatus to perform the FT synthesis reaction, and the catalyst may also be transferred through a pipe to the reaction apparatus to perform the FT synthesis without being in contact with the air.

On the other hand, in the case where the reduction treatment is performed in a facility located in a place different from that of the facility to carry out the FT synthesis reaction such as a catalyst production facility, the catalyst activated by the reduction treatment is deactivated if the catalyst is brought into contact with the air during transportation or the like. The activated catalyst is subjected to a stabilization treatment in order to prevent the deactivation. Examples of the stabilization treatment include a method for performing a light oxidation treatment on an activated catalyst to form an oxidation coating on the surface of an active metal so that oxidation due to contact with the air does not further proceed, or a method for coating an activated catalyst with a hydrocarbon wax or the like in the absence of the air to block contact with the air. In the method for forming an oxidation coating, the catalyst can be fed to the FT synthesis reaction as it is after transportation, and also in the method for performing covering with a wax or the like, when the catalyst is suspended in liquid hydrocarbons to form a slurry, the wax or the like used for covering is dissolved in the liquid hydrocarbons to exert the activity.

The slurry bubble column reactor C2 accommodates therein a slurry in which the FT synthesis catalyst particles are suspended in the liquid hydrocarbons (product of the FT synthesis reaction). The synthesis gas (CO and $H_2$) obtained in Step S1 is injected in the slurry in the slurry bubble column reactor C2 through a dispersion plate (not shown) installed in the bottom of the reaction apparatus. The synthesis gas blown to the slurry turns to bubbles and moves upward in the slurry to the upper portion of the slurry bubble column reactor C2. In the course thereof, the synthesis gas is dissolved in the liquid hydrocarbons to be in contact with the FT synthesis catalyst particles, and thereby the FT synthesis reaction proceeds to produce hydrocarbons. The FT synthesis reaction is represented by the following chemical reaction formula (3), for example.

(3)

A gaseous phase exists in the upper portion of the slurry accommodated in the slurry bubble column reactor C2. The light hydrocarbons that are produced by the FT synthesis reaction and that are gaseous under the condition in the slurry bubble column reactor C2 and the unreacted synthesis gas (CO and $H_2$) move from the slurry to the gaseous phase and are further discharged from the top of the slurry bubble column reactor C2 through the line L2. Then, the discharged light hydrocarbons and the unreacted synthesis gas are separated by the gas liquid separator D2 including a cooler (not shown) connected to the line L2, into the gas fraction containing the unreacted synthesis gas and hydrocarbon gas having $C_4$ or less as main components and liquid hydrocarbons (light hydrocarbon oil) liquefied by cooling. Of these, the gas fraction is recycled to the slurry bubble column reactor C2, and the unreacted synthesis gas contained in the gas fraction is fed to the FT synthesis reaction again. On the other hand, the light hydrocarbon oil is fed through a line L4 and a line L8 to the first fractionator C4.

On the other hand, the hydrocarbons (heavy hydrocarbon oil) that are produced by the FT synthesis reaction and that are liquid under the condition in the slurry bubble column reactor C2 and the slurry containing the FT synthesis catalyst particles are fed from the vicinity of the middle of the slurry bubble column reactor C2 through the line L6 to the catalyst separator D4. The FT synthesis catalyst particles in the slurry are captured by a filter installed in the catalyst separator D4. The heavy hydrocarbon oil in the slurry passes through the filter to be separated from the FT synthesis catalyst particles, and is discharged by the line L8 to be mixed with the light hydrocarbon oil from the line L4. The mixture of the heavy hydrocarbon oil and the light hydrocarbon oil is heated in a heat exchanger H2 installed on the line L8, and then fed to the first fractionator C4.

As the product of the FT synthesis reaction, gaseous hydrocarbons (light hydrocarbons) discharged from the top of the slurry bubble column reactor C2 and liquid hydrocarbons (heavy hydrocarbon oil) discharged from the slurry bubble column reactor C2 by the line L6 are obtained. These hydrocarbons are substantially normal paraffins, and few aromatic hydrocarbons, naphthene hydrocarbons and isoparaffins are contained. Distribution of a number of carbon atoms of the light hydrocarbons and heavy hydrocarbon oil in combination widely ranges from $C_4$ or less as gas at normal temperature to approximately $C_{80}$, for example, as a solid (wax) at room temperature. The product of the FT synthesis reaction also contains olefins and oxygen-containing compounds containing oxygen atoms derived from carbon monoxide (for example, alcohols) as by-products.

The reaction condition on the FT synthesis reaction in the slurry bubble column reactor C2 is not limited, but the following reaction conditions are selected, for example. Namely, the reaction temperature is preferably 150 to 300° C. from the viewpoints of increase in conversion of carbon monoxide and increase in a number of carbon atoms of hydrocarbons to be produced. The reaction pressure is preferably 0.5 to 5.0 MPa. A ratio of hydrogen/carbon monoxide in the raw gas (molar ratio) is preferably 0.5 to 4.0. Here, the conversion of carbon monoxide is desirably 50% or more from the viewpoint of the production efficiency.

Here, the reaction temperature is the average temperature $T_1$ of the slurry. Usually, the temperature of the slurry is preferably uniform as much as possible over the entire area of the slurry, thereby making it possible to suppress deterioration in the catalyst activity of the FT synthesis reaction catalyst.

On the other hand, it is preferable from the viewpoint of reducing the load of the filter that the temperature of the slurry be controlled so that the difference $T_2-T_1$ between the average temperature $T_1$ and the temperature $T_2$ at the liquid level is 5 to 30° C. This allows the amount of hydrocarbons to be discharged as the light hydrocarbons to be increased and the amount of hydrocarbons passing through the filter as the heavy hydrocarbon oil to be reduced, thereby making it possible to reduce the load of the filter. Here, if the difference $T_2-T_1$ between the average temperature $T_1$ and the temperature $T_2$ at the liquid level is lower than 5° C., the effect of the present invention is not sufficiently achieved, and if it is higher than 30° C., the catalyst activity of the FT synthesis reaction catalyst is remarkably deteriorated in some cases. Moreover, the difference $T_2-T_1$ is more preferably 7 to 28° C. and still more preferably 10 to 25° C.

Here, even in the case where the temperature $T_2$ at the liquid level of the slurry is raised, the composition of a hydrocarbon oil to be obtained is substantially identical as long as the average temperature $T_1$ of the slurry is constant. Therefore, the temperature of the slurry is controlled so that the difference $T_2-T_1$ is 5 to 30° C., thereby making it possible to reduce the load of the filter while maintaining the composition of a hydrocarbon oil to be obtained.

The average temperature $T_1$ of the slurry is preferably 190 to 250° C., and more preferable 200 to 240° C. Moreover, the temperature $T_2$ at the liquid level of the slurry is preferably 260° C. or lower, and more preferably 250° C. or lower. If the average temperature $T_1$ is lower than 190° C., the FT synthesis reaction does not proceed sufficiently in some cases, and if the average temperature $T_1$ is higher than 250° C. or the temperature $T_2$ at the liquid level is higher than 260° C., the catalyst activity of the FT synthesis reaction catalyst is deteriorated in some cases.

If the opening of the filter provided in the catalyst separator D4 is smaller than the particle size of the FT synthesis catalyst particles, it is not particularly limited, but it is preferably 5 to 30 μm, and more preferably 5 to 25 μm. The FT synthesis catalyst particles captured by the filter provided in the catalyst separator D4 are returned to the slurry bubble column reactor C2 through the line L10 by appropriately allowing liquid hydrocarbons to flow through the filter in a direction opposite to the flowing direction at the time of filtration (backwashing).

(Step S3)

In Step S3, the hydrocarbon oil comprising the mixture of the light hydrocarbon oil and the heavy hydrocarbon oil fed from the slurry bubble column reactor C2 (FT synthetic oil) is fractionated in the first fractionator C4. By this fractionating, the FT synthetic oil is separated into the raw naphtha fraction having approximately $C_5$ to $C_{10}$ with a boiling point of lower than about 150° C., the raw middle distillate having approximately $C_{11}$ to $C_{21}$ with a boiling point of about 150 to 360° C., and the raw wax fraction having approximately $C_{22}$ or more with a boiling point of higher than about 360° C.

The raw naphtha fraction is discharged through a line L20 connected to the top of the first fractionator C4. The raw middle distillate is discharged through a line L18 connected to the middle of the first fractionator 40. The raw wax fraction is discharged through the line L12 connected to the bottom of the first fractionator C4.

(Step S4)

The line L12 connected to the bottom of the first fractionator C4 is connected to a mixing drum D6, and the mixing drum D6 and the hydrocracking apparatus C6 are connected by the line L16.

The line L12 is connected to the bottom of the second fractionator C12 described later, and is connected to a line L38 that discharges a bottom oil from the second fractionator C12. The raw wax fraction discharged from the first fractionator C4 is mixed with the bottom oil transferred through the line L38 in the mixing drum D6, and is transferred to the hydrocracking apparatus C6 via the line L16.

(Step S5)

The raw wax fraction transferred from the first fractionator C4 in Step S4, with hydrogen gas fed by a feed line of hydrogen gas (not shown) connected to the line L16, is heated to the temperature needed for hydrocracking of the raw wax fraction by a heat exchanger H4 installed on the line L16, and then fed to the hydrocracking apparatus C6 to be hydrocracked. The raw wax fraction not sufficiently hydrocracked in the hydrocracking apparatus C6 (hereinafter, referred to as the "uncracked wax fraction" in some cases) is recovered as a bottom oil of the second fractionator C12 in Step S8, recycled by the line L38 to the line L12, mixed with the raw wax fraction from the first fractionator C4 in the mixing drum D6, and fed to the hydrocracking apparatus C6 again.

The type of the hydrocracking apparatus C6 is not particularly limited, and a fixed bed flow reaction apparatus packed with a hydrocracking catalyst is preferably used. The reaction apparatus may be singular, or a plurality of reaction apparatuss may be provided in serial or in parallel. Moreover, the catalyst bed in the reaction apparatus may be singular or plural.

As the hydrocracking catalyst packed in the hydrocracking apparatus C6, a known hydrocracking catalyst is used, and a catalyst in which a metal having hydrogenation activity and belonging to Group 8 to Group 10 in the periodic table of the elements is supported by an inorganic catalyst support having solid acidity is preferably used.

Examples of the inorganic catalyst support that constitutes the hydrocracking catalyst and has suitable solid acidity include those comprising zeolites such as ultra stable Y-type (USY) zeolite, Y-type zeolite, mordenite, and β zeolite, and one or more inorganic compounds selected from amorphous composite metal oxides having heat resistance such as silica alumina, silica zirconia, and alumina boria. Further, as the catalyst support, compositions constituted by comprising USY zeolite, and one or more amorphous composite metal oxides selected from silica alumina, alumina boria, and silica zirconia are more preferable, and compositions constituted by comprising USY zeolite and alumina boria and/or silica alumina are still more preferable.

USY zeolite is one obtained by ultra-stabilizing Y-type zeolite by a hydrothermal treatment and/or an acid treatment; in addition to a fine porous structure called micro pores that Y-type zeolite originally has and whose pore size is 2 nm or smaller, new pores having a pore size in the range of 2 to 10 nm are formed. The average particle size of USY zeolite is not particularly limited, but it is preferably 1.0 μm or smaller, and more preferably 0.5 μm or smaller. Moreover, in USY zeolite, it is preferable that a molar ratio of silica/alumina (molar ratio of silica to alumina) be 10 to 200, and it is more preferable that the molar ratio be 15 to 100, and it is still more preferable that the molar ratio be 20 to 60.

Moreover, it is preferable that the catalyst support contain a crystalline zeolite to be 0.1 to 80% by mass and an amorphous composite metal oxide having heat resistance to be 0.1 to 60% by mass.

The catalyst support can be produced as follows: a catalyst support comprising the inorganic compound having solid acidity and a binder is molded, and calcined. The proportion of the inorganic compound having solid acidity to be compounded is preferably 1 to 70% by mass, and more preferably 2 to 60% by mass based on the whole mass of the catalyst support. Moreover, in the case where the catalyst support contains USY zeolite, the proportion of USY zeolite to be compounded is preferably 0.1 to 10% by mass, and more preferably 0.5 to 5% by mass based on the whole mass of the catalyst support. Further, in the case where the catalyst support contains USY zeolite and alumina boria, it is preferable that the proportion of USY zeolite to alumina boria to be compounded (USY zeolite/alumina boria) be 0.03 to 1 in the mass ratio. Moreover, in the case where the catalyst support contains USY zeolite and silica alumina, it is preferable that the proportion of USY zeolite to silica alumina to be compounded (USY zeolite/silica alumina) be 0.03 to 1 in the mass ratio.

The binder is not particularly limited, but alumina, silica, titania, and magnesia are preferable, and alumina is more preferable. The amount of the binder to be compounded is preferably 20 to 98% by mass, and more preferably 30 to 96% by mass based on the whole mass of the catalyst support.

A calcination temperature of the catalyst support is preferably in the range of 400 to 550° C., more preferably in the range of 470 to 530° C., and still more preferably in the range of 490 to 530° C. The calcination at such a temperature makes it possible to provide sufficient solid acidity and mechanical strength to the catalyst support.

Examples of the metal belonging to Groups 8 to 10 in the periodic table supported by the catalyst support and having hydrogenation activity specifically include cobalt, nickel, rhodium, palladium, iridium, and platinum. Among them, metals selected from nickel, palladium, and platinum are preferably used singularly or in combinations of two or more. These metals can be supported on the catalyst support mentioned above by a standard method such as impregnation and ion exchange. The amount of the metal to be supported is not particularly limited, but it is preferable that the total amount of the metal be 0.1 to 3.0% by mass based on the mass of the catalyst support. Here, the periodic table of the elements refers to the long form of the periodic table of the elements based on the specification by IUPAC (the International Union of Pure and Applied Chemistry).

In the hydrocracking apparatus C6, the raw wax fraction and a part of the uncracked wax fraction (hydrocarbons having approximately $C_{22}$ or more) are converted into hydrocarbons having approximately $C_{21}$ or less by hydrocracking, but a part thereof is further converted into a naphtha fraction (approximately $C_5$ to $C_{10}$) lighter than the intended middle distillate (approximately $C_{11}$ to $C_{21}$) and also gaseous hydrocarbons having $C_4$ or less by excessive cracking. On the other hand, the raw wax fraction and a part of the uncracked wax fraction do not sufficiently undergo hydrocracking, and turn to an uncracked wax fraction having approximately $C_{22}$ or more. The composition of the hydrocracking product is determined according to the hydrocracking catalyst to be used and the hydrocracking reaction condition. Here, the "hydrocracking product" refers to all hydrocracking products containing the uncracked wax fraction, unless otherwise specified. If the hydrocracking reaction condition is tighter than necessary, the content of the uncracked wax fraction in the hydrocracking product is reduced while the light fraction containing the naphtha fraction is increased to decrease the yield of the intended middle distillate. On the other hand, if the hydrocracking reaction condition is milder than necessary, the uncracked wax fraction is increased to decrease the yield of the middle distillate. In the case where a ratio M2/M1 of a mass M2 of a cracking product with a boiling point of 25 to 360° C. to a mass M1 of all cracking products with a boiling point of 25° C. or higher is defined as a "cracking rate," the reaction condition is selected so that the cracking rate M2/M1 is usually 20 to 90%, preferably 30 to 80%, and more preferably 45 to 70%.

In the hydrocracking apparatus C6, a hydro-isomerizing reaction of normal paraffins that constitute the raw wax fraction and the uncracked wax fraction or hydrocracking products thereof proceeds in parallel with the hydrocracking reaction, to produce isoparaffins. In the case where the hydrocracking product is used as the base stock for fuel oil, isoparaffins to be produced by the hydro-isomerizing reaction is a component that contributes to improvement in cold flow property (fluidity in a low temperature), and it is preferable that the production rate be high. Further, removal of olefins and oxygen-containing compounds such as alcohols that are contained in the raw wax fraction and are by-products of the FT synthesis reaction also proceeds. Namely, the olefins are converted into paraffin hydrocarbons by hydrogenation, and the oxygen-containing compounds are converted into paraffin hydrocarbons and water by hydro-deoxidizing.

The reaction condition in the hydrocracking apparatus C6 is not limited, but the following reaction condition can be selected. Namely, examples of the reaction temperature include 180 to 400° C., 200 to 370° C. is preferable, 250 to 350° C. is more preferable, and 280 to 350° C. is particularly preferable. If the reaction temperature is higher than 400° C., not only cracking into the light fraction tends to proceed to decrease the yield of the middle distillate, but also the product tends to be colored and to be restricted for use as the base stock for fuel oil. On the other hand, if the reaction temperature is lower than 180° C., not only the hydrocracking reaction tends not to sufficiently proceed to decrease the yield of the middle distillate, but also production of isoparaffins by the hydro-isomerizing reaction tends to be suppressed and oxygen-containing compounds such as alcohols tend not to sufficiently be removed to remain. Examples of the hydrogen partial pressure include 0.5 to 12 MPa, and 1.0 to 5.0 MPa is preferable. If the hydrogen partial pressure is lower than 0.5 MPa, hydrotreating, hydro-isomerizing and the like tend not to sufficiently proceed, on the other hand, if the hydrogen partial pressure is higher than 12 MPa, high pressure resistance is demanded for the apparatus, and facility cost tends to be increased. Examples of the liquid hourly space velocity (LHSV) of the raw wax fraction and the uncracked wax fraction include 0.1 to 10.0 $h^{-1}$, and 0.3 to 3.5 $h^{-1}$ is preferable. If the LHSV is lower than 0.1 $h^{-1}$, the hydrocracking tends to excessively proceed and productivity tends to be reduced, on the other hand, if the LHSV is higher than 10.0 $h^{-1}$, hydrotreating, hydro-isomerizing and the like tend not to sufficiently proceed. Examples of the ratio of hydrogen/oil include 50 to 1000 NL/L, and 70 to 800 NL/L is preferable. If the ratio of hydrogen/oil is lower than 50 NL/L, hydrotreating, hydro-isomerizing and the like tend not to sufficiently proceed, on the other hand, if the ratio of hydrogen/oil is higher than 1000 NL/L, a large-sized hydrogen feeding apparatus and the like tend to be needed.

In this example, the hydrocracking product and the unreacted hydrogen gas discharged from the hydrocracking apparatus C6 are cooled and separated into gas and liquid in a two-stage by a gas liquid separator D8 and a gas liquid separator D10, the relatively heavy liquid hydrocarbons containing the uncracked wax fraction is obtained from the gas liquid separator D8, and the gas fraction mainly containing hydrogen gas and gaseous hydrocarbons having $C_4$ or less and the relatively light liquid hydrocarbons are obtained from the gas liquid separator D10. By such two-stage cooling and gas liquid separation, the occurrence of clogging of the line accompanied by solidification by rapid cooling of the uncracked wax fraction contained in the hydrocracking product can be prevented. The liquid hydrocarbons each obtained in the gas liquid separator D8 and the gas liquid separator D10 are mixed in a line L32 through a line L28 and a line L26, respectively. The gas fraction separated in a gas liquid separator D12 and mainly containing hydrogen gas and gaseous hydrocarbons with $C_4$ or less is fed to the middle distillate hydrotreating apparatus C8 and the naphtha fraction hydrotreating apparatus C10 through a line (not shown) connecting the gas liquid separator D10 to the line L18 and the line L20, and hydrogen gas is reused.

(Step S6)

The raw middle distillate discharged from the first fractionator C4 by the line L18, with the hydrogen gas fed by a feed line of hydrogen gas connected to the line L18 (not shown), is heated to the temperature needed for hydrotreating of the raw middle distillate by a heat exchanger H6 installed in the line L18, and then fed to the middle distillate hydrotreating apparatus C8 to be hydrotreated.

The type of the middle distillate hydrotreating apparatus C8 is not particularly limited, and a fixed bed flow reaction apparatus packed with a hydrotreating catalyst is preferably used. The reaction apparatus may be singular, or a plurality of reaction apparatuss may be provided in serial or in parallel. Moreover, the catalyst bed in the reaction apparatus may be singular or plural.

As the hydrotreating catalyst to be used in the middle distillate hydrotreating apparatus C8, catalysts to be usually used for hydrotreating and/or hydro-isomerizing in petroleum refining or the like, namely, catalysts in which a metal having hydrogenation activity is supported by an inorganic catalyst support can be used.

As the metal having hydrogenation activity that constitutes the hydrotreating catalyst, one or more metals selected from the group consisting of metals in Groups 6, 8, 9, and 10 in the periodic table of the elements are used. Specific examples of these metals include noble metals such as platinum, palladium, rhodium, ruthenium, iridium, and osmium, or cobalt, nickel, molybdenum, tungsten, and iron; preferable are platinum, palladium, nickel, cobalt, molybdenum, and tungsten, and more preferable are platinum and palladium. Moreover, a plurality of these metals are also preferably used in combination; examples of a preferable combination in this case include platinum-palladium, cobalt-molybdenum, nickel-molybdenum, nickel-cobalt-molybdenum, and nickel-tungsten.

Examples of the inorganic catalyst support that constitutes the hydrotreating catalyst include metal oxides such as alumina, silica, titania, zirconia, and boria. These metal oxides may be used singularly, or used as a mixture of two or more thereof, or a composite metal oxide such as silica alumina, silica zirconia, alumina zirconia, and alumina boria. From the viewpoint of allowing hydro-isomerizing of normal paraffins to efficiently proceed at the same time of hydrotreating, it is preferable that the inorganic catalyst support be a composite metal oxide having solid acidity such as silica alumina, silica zirconia, alumina zirconia, and alumina boria. Moreover, a small amount of zeolite may be contained in the inorganic catalyst support. Further, in order to enhance the moldability and mechanical strength of the catalyst support, a binder may be compounded in the inorganic catalyst support. Examples of the preferable binder include alumina, silica, and magnesia.

In the case where the metal is the above-described noble metal, it is preferable that the content of the metal having hydrogenation activity in the hydrotreating catalyst be approximately 0.1 to 3% by mass as a metal atom based on the mass of the catalyst support. Moreover, in the case where the metal is a metal other than the above-described noble metal, it is preferable that the content be approximately 2 to 50% by mass as a metal oxide based on the mass of the catalyst support. In the case where the content of the metal having hydrogenation activity is less than the lower limit value, hydrotreating and hydro-isomerizing tend not to sufficiently proceed. On the other hand, in the case where the content of the metal having hydrogenation activity is more than the upper limit value, dispersion of the metal having hydrogenation activity tends to be lowered to deteriorate the activity of the catalyst, and cost of the catalyst is increased.

The raw middle distillate (which contains normal paraffins with approximately $C_{11}$ to $C_{20}$ as a main component) is hydrotreated in the middle distillate hydrotreating apparatus C8. In this hydrotreating, olefins that are a by-product of the FT synthesis reaction contained in the raw middle distillate are hydrogenated to be converted into paraffin hydrocarbons. Moreover, oxygen-containing compounds such as alcohols are converted into paraffin hydrocarbons and water by hydro-dehydrogenation. Moreover, in parallel with the hydrotreating, the hydro-isomerizing reaction of normal paraffins that constitute the raw middle distillate proceeds to produce isoparaffins. In the case where the middle distillate is used as the base stock for fuel oil, the isoparaffins produced by the hydro-isomerizing reaction are a component contributing to improvement in cold flow property, and it is preferable that the production rate be high.

The reaction condition in the middle distillate hydrotreating apparatus C8 is not limited, but the following reaction condition can be selected. Namely, examples of the reaction temperature include 180 to 400° C., 200 to 370° C. is preferable, 250 to 350° C. is more preferable, and 280 to 350° C. is particularly preferable. If the reaction temperature is higher than 400° C., not only cracking into the light fraction tends to proceed to decrease the yield of the middle distillate, but also the product tends to be colored and to be restricted for use as the base stock for fuel oil. On the other hand, if the reaction temperature is lower than 180° C., oxygen-containing compounds such as alcohols tend not to sufficiently be removed to remain, and production of isoparaffins by the hydro-isomerizing reaction tends to be suppressed. Examples of the hydrogen partial pressure include 0.5 to 12 MPa, and 1.0 to 5.0 MPa is preferable. If the hydrogen partial pressure is lower than 0.5 MPa, hydrotreating and hydro-isomerizing tend not to sufficiently proceed, on the other hand, if the hydrogen partial pressure is higher than 12 MPa, high pressure resistance is demanded for the apparatus, and facility cost tends to be increased. Examples of the liquid hourly space velocity (LHSV) of the raw middle distillate include 0.1 to 10.0 $h^{-1}$, and 0.3 to 3.5 $h^{-1}$ is preferable. If the LHSV is lower than 0.1 $h^{-1}$, cracking into the light fraction tends to proceed to decrease the yield of the middle distillate, and productivity tends to be reduced, on the other hand, if the LHSV is higher than 10.0 $h^{-1}$, hydrotreating and hydro-isomerizing tend not to sufficiently proceed. Examples of the ratio of hydrogen/oil include 50 to 1000 NL/L, and 70 to 800 NL/L is preferable. If the ratio of hydrogen/oil is lower than 50 NL/L, hydrotreating and hydro-isomerizing tend not to sufficiently proceed, on the other hand, if the ratio of hydrogen/oil is higher than 1000 NL/L, a large-sized hydrogen feeding apparatus and the like tend to be needed.

The effluent oil from the middle distillate hydrotreating apparatus C8, from which a gas fraction mainly containing unreacted hydrogen gas has been separated in the gas liquid separator D12 connected to the line L30, is transferred through the line L32, and mixed with the hydrocracking product of the liquid wax fraction transferred by the line L26. The gas fraction mainly containing hydrogen gas separated in the gas liquid separator D12 is fed to the hydrocracking apparatus C6, and reused.

(Step S7)

The raw naphtha fraction discharged from the first fractionator C4 by the line L20, with hydrogen gas fed by a feed line of hydrogen gas (not shown) connected to the line L20, is heated to the temperature needed for hydrotreating of the raw naphtha fraction by a heat exchanger H8 installed on the line L20, and then fed to the naphtha fraction hydrotreating apparatus C10 to be hydrotreated.

The type of the naphtha fraction hydrotreating apparatus 10 is not particularly limited, and a fixed bed flow reaction apparatus packed with a hydrotreating catalyst is preferably used. The reaction apparatus may be singular, or a plurality of reaction apparatuss may be provided in serial or in parallel. Moreover, the catalyst bed within the reaction apparatus may be singular or plural.

The hydrotreating catalyst to be used in the naphtha fraction hydrotreating apparatus 10 is not particularly limited, but it may be the same hydrotreating catalyst as that to be used for hydrotreating the raw middle distillate.

In the naphtha fraction hydrotreating apparatus C10, unsaturated hydrocarbons contained in the raw naphtha fraction (containing normal paraffins having approximately $C_5$ to $C_{10}$ as a main component) are converted into paraffin hydrocarbons by hydrogenating. Moreover, oxygen-containing compounds such as alcohols contained in the raw naphtha fraction are converted into paraffin hydrocarbons and water by hydro-deoxidizing. It is to be noted that the hydro-isomerizing reaction does not proceed so much because a number of carbon atoms in the naphtha fraction is small.

The reaction condition in the naphtha fraction hydrotreating apparatus C10 is not limited, but the same reaction condition as that in the middle distillate hydrotreating apparatus C8 mentioned above can be selected.

The effluent oil of the naphtha fraction hydrotreating apparatus C10 is fed through a line L34 to a gas liquid separator D14; in the gas liquid separator D14, the effluent oil is separated into the gas fraction containing hydrogen gas as a main component, and liquid hydrocarbons. The gas fraction obtained by separation is fed to the hydrocracking apparatus C6, and hydrogen gas contained in this is reused. On the other hand, the liquid hydrocarbons obtained by separation are transferred through a line L36 to the naphtha stabilizer C14. Moreover, a part of the liquid hydrocarbons is recycled through a line L48 to the line L20 upstream of the naphtha fraction hydrotreating apparatus C10. Because the amount of heat to be generated in hydrotreating of the raw naphtha fraction (hydrogenation of olefins and hydro-deoxidizing of alcohols and the like) is large, a part of the hydrotreated naphtha fraction is recycled to the naphtha fraction hydrotreating apparatus C10, and the raw naphtha fraction is diluted, thereby suppressing a rise in the temperature in the naphtha fraction hydrotreating apparatus C10.

In the naphtha stabilizer C14, the liquid hydrocarbons fed from the naphtha fraction hydrotreating apparatus C10 and the second fractionator C12 are fractionated to obtain treated naphtha with carbon atoms of $C_5$ to $C_{10}$ as a product. The treated naphtha is transferred from the bottom of the naphtha stabilizer C14 through a line L46 to a naphtha tank T6, and stored. On the other hand, hydrocarbon gas containing hydrocarbons with a number of carbon atoms of a predetermined number or less ($C_4$ or less) as a main component is discharged from a line L50 connected to the top of the naphtha stabilizer C14. Because the hydrocarbon gas is not the intended product, it is introduced into an external burning facility (not shown) to be burned, and then discharged into the air.

(Step S8)

The mixed oil comprising the liquid hydrocarbons obtained from the product from the hydrocracking apparatus C6 and the liquid hydrocarbons obtained from the product from the middle distillate hydrotreating apparatus C8 is heated by a heat exchanger H10 installed in the line L32, and then fed to the second fractionator C12 to be fractionated into hydrocarbons having approximately $C_{10}$ or less, a kerosene fraction, a gas oil fraction, and an uncracked wax fraction. The hydrocarbons having approximately $C_{10}$ or less have a boiling point of lower than about 150° C., and are discharged from the top of the second fractionator C12 by a line L44. The kerosene fraction has a boiling point of about 150 to 250° C., and is discharged from the middle of the second fractionator C12 by a line L42 to be stored in a tank T4. The gas oil fraction has a boiling point of about 250 to 360° C., and is discharged from the lower portion of the second fractionator C12 by a line L40 to be stored in a tank T2. The uncracked wax fraction has a boiling point of higher than about 360° C., and is discharged from the bottom of the second fractionator C12 to be recycled by the line L38 to the line L12 upstream of the hydrocracking apparatus C6. The hydrocarbons having approximately $C_{10}$ or less discharged from the top of the second fractionator C12 is fed by the lines L44 and L36 to the naphtha stabilizer, and fractionated with the liquid hydrocarbons fed from the naphtha fraction hydrotreating apparatus C10.

(Confirmation Test 1)

Temperatures of the lower portion of the slurry, the middle portion of the slurry and the upper portion of the slurry including the liquid level were controlled as described as Tests 1 to 3 in Table 1 by the heat-transfer pipes A2, A4 and A6 as temperature control means in the slurry bubble column reactor C2, and it has revealed that the amounts of hydrocarbon oils each discharged as light hydrocarbons (in Tables, represented by "light fraction") and as a heavy hydrocarbon oil (in Tables, represented by "heavy fraction") are as described in the following Table 2.

It is to be noted that "ΔT" in Tables denotes the difference $T_2-T_1$ between the average temperature $T_1$ and the temperature $T_2$ at the liquid level. Moreover, the "rate of increase in light fraction" in Tables denotes a ratio $C_2/C_1$ or $C_3/C_1$ (mass ratio) of the amount ($C_2$ or $C_3$) of light hydrocarbons discharged in Test 2 or Test 3 to the amount of light hydrocarbons discharged in Test 1 ($C_1$).

TABLE 1

|  | lower portion of slurry | middle portion of slurry | upper portion of slurry | average temperature $T_1$ | ΔT |
|---|---|---|---|---|---|
| Test 1 | 229° C. | 228° C. | 228° C. | 228.3° C. | −0.3° C. |
| Test 2 | 225° C. | 229° C. | 231° C. | 228.3° C. | 2.7° C. |
| Test 3 | 217° C. | 232° C. | 236° C. | 228.3° C. | 7.7° C. |

TABLE 2

|  | light fraction | heavy fraction | rate of increase in light fraction |
|---|---|---|---|
| Test 1 | 58.9 | 41.1 | — |
| Test 2 | 63.1 | 36.9 | 1.07 |
| Test 3 | 72.6 | 27.4 | 1.23 |

As shown in Table 1 and Table 2, the amount of the hydrocarbon oil discharged as the light hydrocarbons in Test 3 where the difference T2−T1 (T) between the average temperature T1 and the temperature T2 at the liquid level was 5 C or higher was significantly increased as compared as those in Test 1 and Test 2.

Moreover, compositions of hydrocarbons to be discharged as the light hydrocarbons and the heavy hydrocarbon oils in Tests 1 to 3 are as described in the following Tables 3 to 5.

TABLE 3

| | Test 1 | | |
|---|---|---|---|
| number of carbon atoms | light fraction | heavy fraction | total |
| C3 | 0.0 | 0.0 | 0.0 |
| C4 | 0.0 | 0.0 | 0.0 |
| C5 | 3.0 | 0.0 | 3.0 |
| C6 | 5.6 | 0.0 | 5.6 |
| C7 | 6.0 | 0.0 | 6.0 |
| C8 | 5.9 | 0.0 | 5.9 |
| C9 | 5.7 | 0.0 | 5.7 |
| C10 | 5.3 | 0.1 | 5.4 |
| C11 | 4.8 | 0.3 | 5.1 |
| C12 | 4.5 | 0.4 | 4.9 |
| C13 | 3.9 | 0.5 | 4.4 |
| C14 | 3.4 | 0.8 | 4.2 |
| C15 | 2.7 | 1.2 | 3.9 |
| C16 | 2.1 | 1.5 | 3.6 |
| C17 | 1.6 | 1.7 | 3.3 |
| 018 | 1.3 | 1.8 | 3.0 |
| C19 | 0.9 | 1.9 | 2.8 |
| C20 | 0.7 | 1.8 | 2.6 |
| C21 | 0.5 | 1.8 | 2.3 |
| C22 | 0.4 | 1.9 | 2.2 |
| C23 | 0.3 | 1.8 | 2.0 |
| C24 | 0.2 | 1.8 | 2.0 |
| C25 | 0.1 | 1.7 | 1.8 |
| C26 | 0.1 | 1.6 | 1.7 |
| C27 | 0.1 | 1.5 | 1.6 |
| C28 | 0.0 | 1.4 | 1.4 |
| C29 | 0.0 | 1.3 | 1.3 |
| C30 | 0.0 | 1.2 | 1.2 |
| C31 | 0.0 | 1.1 | 1.1 |
| C32 | 0.0 | 1.0 | 1.0 |
| C33 | 0.0 | 0.9 | 0.9 |
| C34 | 0.0 | 0.8 | 0.8 |
| C35 | 0.0 | 0.7 | 0.7 |
| C36 | 0.0 | 0.7 | 0.7 |
| C37 | 0.0 | 0.6 | 0.6 |
| C38 | 0.0 | 0.5 | 0.5 |
| C39 | 0.0 | 0.5 | 0.5 |
| C40 | 0.0 | 0.4 | 0.4 |
| C41 | 0.0 | 0.4 | 0.4 |
| C42 | 0.0 | 0.4 | 0.4 |
| C43 | 0.0 | 0.4 | 0.4 |
| C44 | 0.0 | 0.3 | 0.3 |
| C45 | 0.0 | 0.3 | 0.3 |
| C46 | 0.0 | 0.3 | 0.3 |
| C47 | 0.0 | 0.3 | 0.3 |
| C48 | 0.0 | 0.3 | 0.3 |
| C49 | 0.0 | 0.2 | 0.2 |
| C50 | 0.0 | 0.2 | 0.2 |
| C51+ | 0.0 | 2.5 | 2.5 |
| total | 58.9 | 41.1 | 100.0 |

TABLE 4

Test 2

| number of carbon atoms | light fraction | heavy fraction | total |
|---|---|---|---|
| C3 | 0.0 | 0.0 | 0.0 |
| C4 | 0.0 | 0.0 | 0.0 |
| C5 | 3.0 | 0.0 | 3.0 |
| C6 | 5.6 | 0.0 | 5.6 |
| C7 | 6.0 | 0.0 | 6.0 |
| C8 | 5.9 | 0.0 | 5.9 |
| C9 | 5.7 | 0.0 | 5.7 |
| C10 | 5.3 | 0.1 | 5.4 |
| C11 | 5.0 | 0.1 | 5.1 |
| C12 | 4.6 | 0.3 | 4.9 |
| C13 | 4.2 | 0.2 | 4.4 |
| C14 | 3.7 | 0.6 | 4.2 |
| C15 | 3.1 | 0.8 | 3.9 |
| C16 | 2.7 | 1.0 | 3.6 |
| C17 | 2.1 | 1.2 | 3.3 |
| C18 | 1.7 | 1.3 | 3.0 |
| C19 | 1.3 | 1.5 | 2.8 |
| C20 | 0.9 | 1.7 | 2.6 |
| C21 | 0.7 | 1.6 | 2.3 |
| C22 | 0.5 | 1.7 | 2.2 |
| C23 | 0.4 | 1.6 | 2.0 |
| C24 | 0.3 | 1.7 | 2.0 |
| C25 | 0.2 | 1.6 | 1.8 |
| C26 | 0.1 | 1.6 | 1.7 |
| C27 | 0.1 | 1.5 | 1.6 |
| C28 | 0.1 | 1.4 | 1.4 |
| C29 | 0.0 | 1.3 | 1.3 |
| C30 | 0.0 | 1.2 | 1.2 |
| C31 | 0.0 | 1.1 | 1.1 |
| C32 | 0.0 | 1.0 | 1.0 |
| C33 | 0.0 | 0.9 | 0.9 |
| C34 | 0.0 | 0.8 | 0.8 |
| C35 | 0.0 | 0.7 | 0.7 |
| C36 | 0.0 | 0.7 | 0.7 |
| C37 | 0.0 | 0.6 | 0.6 |
| C38 | 0.0 | 0.5 | 0.5 |
| C39 | 0.0 | 0.5 | 0.5 |
| C40 | 0.0 | 0.4 | 0.4 |
| C41 | 0.0 | 0.4 | 0.4 |
| C42 | 0.0 | 0.4 | 0.4 |
| C43 | 0.0 | 0.4 | 0.4 |
| C44 | 0.0 | 0.3 | 0.3 |
| C45 | 0.0 | 0.3 | 0.3 |
| C46 | 0.0 | 0.3 | 0.3 |
| C47 | 0.0 | 0.3 | 0.3 |
| C48 | 0.0 | 0.3 | 0.3 |
| C49 | 0.0 | 0.2 | 0.2 |
| C50 | 0.0 | 0.2 | 0.2 |
| C51+ | 0.0 | 2.5 | 2.5 |
| total | 63.1 | 36.9 | 100.0 |

TABLE 5

Test 3

| number of carbon atoms | light fraction | heavy fraction | total |
|---|---|---|---|
| C3 | 0.0 | 0.0 | 0.0 |
| C4 | 0.0 | 0.0 | 0.0 |
| C5 | 3.0 | 0.0 | 3.0 |
| C6 | 5.6 | 0.0 | 5.6 |
| C7 | 6.0 | 0.0 | 6.0 |
| C8 | 5.9 | 0.0 | 5.9 |
| C9 | 5.7 | 0.0 | 5.7 |
| C10 | 5.3 | 0.0 | 5.4 |
| C11 | 5.0 | 0.0 | 5.1 |
| C12 | 4.8 | 0.1 | 4.9 |
| C13 | 4.3 | 0.1 | 4.4 |
| C14 | 4.1 | 0.1 | 4.2 |
| C15 | 3.7 | 0.2 | 3.9 |
| C16 | 3.4 | 0.2 | 3.6 |
| C17 | 3.0 | 0.3 | 3.3 |
| C18 | 2.6 | 0.4 | 3.0 |
| C19 | 2.2 | 0.5 | 2.8 |
| C20 | 1.9 | 0.7 | 2.6 |
| C21 | 1.5 | 0.8 | 2.3 |
| C22 | 1.3 | 1.0 | 2.2 |
| C23 | 0.9 | 1.1 | 2.0 |
| C24 | 0.7 | 1.2 | 2.0 |
| C25 | 0.5 | 1.3 | 1.8 |
| C26 | 0.4 | 1.3 | 1.7 |
| C27 | 0.3 | 1.3 | 1.6 |
| C28 | 0.2 | 1.3 | 1.4 |
| C29 | 0.1 | 1.2 | 1.3 |
| C30 | 0.1 | 1.1 | 1.2 |
| C31 | 0.1 | 1.0 | 1.1 |
| C32 | 0.0 | 1.0 | 1.0 |
| C33 | 0.0 | 0.9 | 0.9 |
| C34 | 0.0 | 0.8 | 0.8 |
| C35 | 0.0 | 0.7 | 0.7 |
| C36 | 0.0 | 0.7 | 0.7 |
| C37 | 0.0 | 0.6 | 0.6 |
| C38 | 0.0 | 0.5 | 0.5 |
| C39 | 0.0 | 0.5 | 0.5 |
| C40 | 0.0 | 0.4 | 0.4 |
| C41 | 0.0 | 0.4 | 0.4 |
| C42 | 0.0 | 0.4 | 0.4 |
| C43 | 0.0 | 0.4 | 0.4 |
| C44 | 0.0 | 0.3 | 0.3 |
| C45 | 0.0 | 0.3 | 0.3 |
| C46 | 0.0 | 0.3 | 0.3 |
| C47 | 0.0 | 0.3 | 0.3 |
| C48 | 0.0 | 0.3 | 0.3 |
| C49 | 0.0 | 0.2 | 0.2 |
| C50 | 0.0 | 0.2 | 0.2 |
| C51+ | 0.0 | 2.5 | 2.5 |
| total | 72.6 | 27.4 | 100.0 |

As shown in Tables 3 to 5, while the proportions of the light hydrocarbons oils and the heavy hydrocarbon oils to be discharged in Tests 1 to 3 each are different from one another, the compositions of the hydrocarbon oils in total in any of Tests 1 to 3 are identical to one another, and for example, change from the condition in Test 1 to the condition in Test 3 makes it possible to reduce the load of the filter while maintaining the composition of a hydrocarbon oil to be obtained.

The suitable embodiments of the process for producing a hydrocarbon oil and the production system according to the present invention have been described above, but the present invention is not necessarily limited to the above-described embodiments.

For example, in the above-described embodiment, natural gas is used as the raw material for production of the synthesis gas with respect to the GTL process, but a non-gaseous hydrocarbon raw material such as asphalt and a residue oil may be used, for example. Moreover, in the above-described embodiment, fractionating into three fractions of the raw naphtha fraction, the raw middle distillate, and the raw wax fraction is performed in the first fractionator C4, and the raw naphtha fraction and the raw middle distillate each are hydrotreated in separate steps, but fractionating into two fractions of a raw light fraction of the raw naphtha fraction and the raw middle distillate in combination and the raw wax fraction may be performed, and the raw light fraction may be hydrotreated in one step. Moreover, in the above-described embodiment, the kerosene fraction and the gas oil fraction are fractionated as separate fractions in the second fractionator C12, but these may be fractionated as one fraction (middle distillate).

Industrial Applicability

According to the present invention, a process for producing a hydrocarbon oil that can reduce a load of a filter for capturing a FT synthesis catalyst while maintaining a composition of a hydrocarbon oil to be obtained, as well as a reactor for a Fischer-Tropsch synthesis and a system for producing a hydrocarbon oil that can realize this are provided.

Reference Signs List 2, 2a . . . filter, C4 . . . first fractionator, C6 . . . hydrocracking apparatus, C8 . . . middle distillate hydrotreating apparatus, C10 . . . naphtha fraction hydrotreating apparatus, C12 . . . second fractionator, L12, L16 . . . first transfer line, L14, L14a . . . second transfer line, 1100 . . . system for producing hydrocarbon oil.

What is claimed is:

1. A reactor for a Fischer-Tropsch synthesis for obtaining a hydrocarbon oil by contacting raw gas containing carbon monoxide and hydrogen with a slurry containing catalyst particles, the reactor comprising:
a reaction apparatus having the slurry and a gaseous phase located above the slurry;
a raw gas feeder that feeds the raw gas to the slurry; and
a temperature controller that controls a temperature of the slurry so that a difference $T_2-T_1$ between the average temperature $T_1$ of the slurry and a temperature $T_2$ at the liquid level of the slurry in contact with the gaseous phase is 5 to 30° C.

2. A system for producing a hydrocarbon oil, comprising the reactor for a Fischer-Tropsch synthesis according to claim 1.

3. The reactor for a Fischer-Tropsch synthesis according to claim 1, comprising at least one temperature measurer that measures the average temperature $T_1$ and the temperature $T_2$.

* * * * *